(12) United States Patent
Helton et al.

(10) Patent No.: US 8,303,804 B2
(45) Date of Patent: Nov. 6, 2012

(54) PROCESS TO IMPROVE JET FUELS

(75) Inventors: Terry E. Helton, Bethlehem, PA (US); William J. Tracy, III, Burk, VA (US); Michael T. Grove, Manvel, TX (US); Dennis H. Hoskin, Westampton, NJ (US); Philip J. Angevine, Woodbury, NJ (US); David A. Pappal, Fair Oaks Ranch, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 706 days.

(21) Appl. No.: 12/287,079

(22) Filed: Oct. 6, 2008

(65) Prior Publication Data

US 2010/0084313 A1    Apr. 8, 2010

(51) Int. Cl.
*C10G 69/02* (2006.01)
(52) U.S. Cl. ........... 208/141; 208/89; 208/134; 208/212
(58) Field of Classification Search .................... 208/88, 208/89, 133, 134, 209, 212, 213, 216 R, 217, 208/60, 141
See application file for complete search history.

(56) References Cited

U.S. PATENT DOCUMENTS

| | | | |
|---|---|---|---|
| 4,419,220 A | 12/1983 | LaPierre et al. | |
| 4,501,926 A | 2/1985 | LaPierre et al. | |
| 4,518,485 A | 5/1985 | LaPierre et al. | |
| 4,592,828 A | 6/1986 | Chu et al. | |
| 4,764,266 A | 8/1988 | Chen et al. | |
| 4,851,109 A | 7/1989 | Chen et al. | |
| 4,913,797 A * | 4/1990 | Albinson et al. | 208/89 |
| 4,960,504 A | 10/1990 | Pellet et al. | |
| 5,282,958 A | 2/1994 | Santilli et al. | |
| 2003/0166452 A1 | 9/2003 | Benazzi et al. | |
| 2003/0168379 A1 | 9/2003 | Degnan et al. | |
| 2005/0092654 A1* | 5/2005 | Ellis et al. | 208/89 |

FOREIGN PATENT DOCUMENTS

| | | |
|---|---|---|
| EP | 0 188 898 A2 | 7/1986 |
| EP | 0 209 233 A1 | 1/1987 |
| FR | 2 805 762 A | 9/2001 |
| WO | 01/64339 A1 | 9/2001 |
| WO | WO 02/088279 A | 11/2002 |
| WO | WO 2008/040980 * | 4/2008 |

OTHER PUBLICATIONS

ExxonMobil Aviation, World Jet Fuel Specifications, 2005 Ed.*

* cited by examiner

*Primary Examiner* — Walter D Griffin
*Assistant Examiner* — Renee E Robinson
(74) *Attorney, Agent, or Firm* — Bruce M. Bordelon

(57) ABSTRACT

This invention relates to a process for improving the yield and properties of jet fuel from a kerosene feed. More particularly, a kerosene feedstock is hydrotreated and dewaxed using a ZSM-48 catalyst to produce a jet fuel in improved yield and having improved properties.

18 Claims, 1 Drawing Sheet

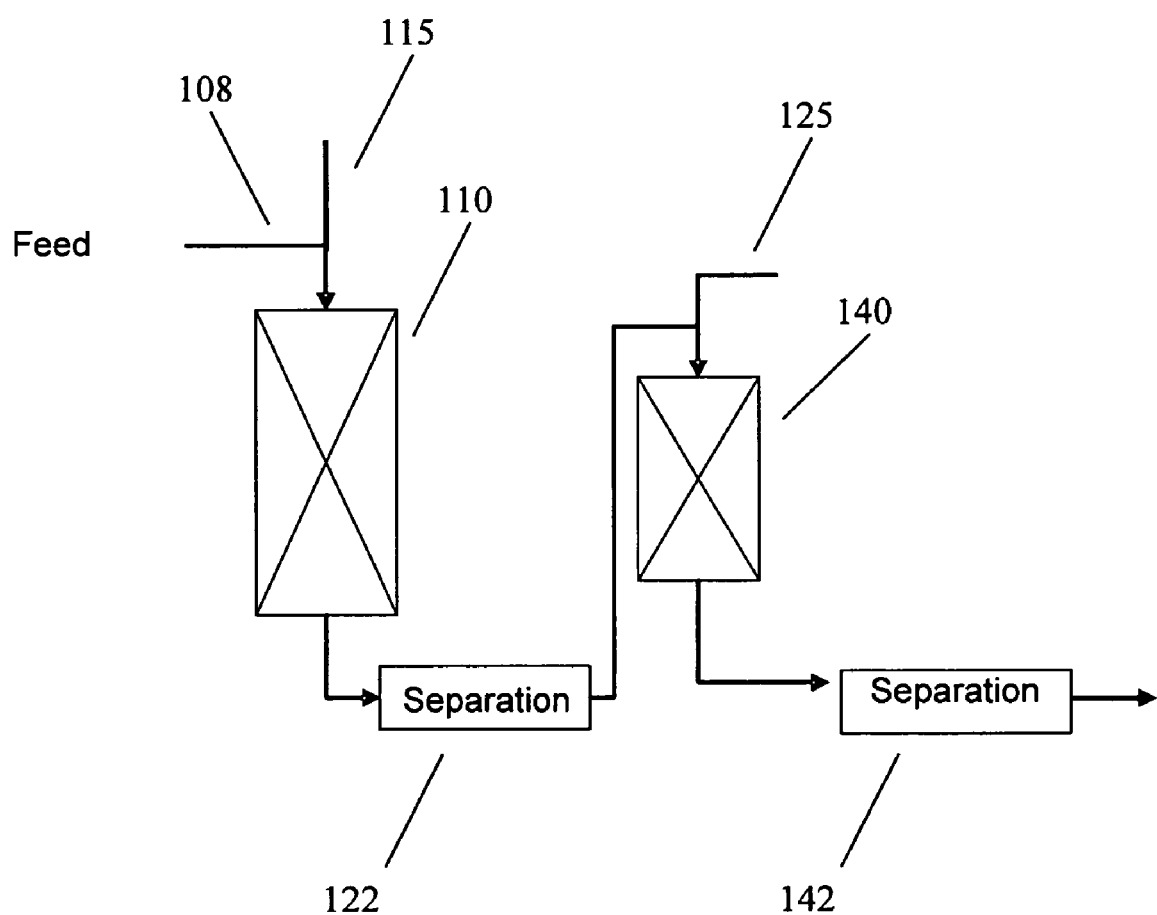

PROCESS TO IMPROVE JET FUELS

FIELD OF THE INVENTION

This invention relates to a process for improving the yield and properties of jet fuel from a kerosene feed. More particularly, a kerosene feedstock is hydrotreated and dewaxed to produce a jet fuel having improved properties.

BACKGROUND OF THE INVENTION

Jet fuels are produced from the petroleum refining process. The production of jet fuel can be simply a cut from a crude fractionator. More frequently, jet fuels go through various processing steps to meet specifications such as acidity, aromatics, olefins, naphthalene, smoke point, sulfur, mercaptan, freeze point, and color. The particular processing required is a function of the grade of jet fuel produced. Light jet fuels having the jet fuel 1 grade are generally straight run kerosene produced from distillation of crudes. Higher jet fuel grades such as JP-5 and JP-8 contain various additives such as anti-oxidants, corrosion inhibitors, dispersants and the like to meet specific end use requirements. Such requirements can be international in scope as jet fuels are used in a global market.

While the overall market for kerosene has been in decline since the 1970's, the market for jet fuels has been expanding in most countries. Thus most U.S. refiners have been running at close to capacity to meet the fuel needs of fuel customers including the need for jet fuels. Currently (2005-2006), the U.S. uses slightly less than 2 million barrels per day of jet fuel. Most of that usage is produced domestically with only a small amount of imports. Exports are also small and mostly comprise fuel loaded on airplanes used for international flights.

A significant volume of kerosene based jet fuel is used for blending with diesel fuel in cold climates. This use may lessen because jet fuel usually contains more sulfur than permitted under the new ultra-low sulfur diesel (ULSD) regulations. Implementation of the ULSD regulations may, however, increase the demand for kerosene within the refinery as a diesel blendstock because it is easier to remove sulfur from kerosene than diesel fuel.

The cost of jet fuel has become a serious issue for airline operators. In general, the cost of jet fuel roughly tracks the cost of crude oil. Thus airline operators have experienced a significant rise in jet fuel costs.

There is a need to maximize the yield of high quality jet fuels derived from kerosene. Factors such as sulfur, flash point, freeze point and smoke point need to be considered in light of changing regulations governing jet fuels.

SUMMARY OF THE INVENTION

Accordingly, there is provided a process for producing a jet fuel from a kerosene feedstock which comprises:

hydrotreating the kerosene feedstock in the presence of a hydrotreating catalyst under hydrotreating conditions to produce a hydrotreated kerosene feedstock;

dewaxing the hydrotreated kerosene feedstock in the presence of a catalyst including a 10 member ring 1-D molecular sieve under dewaxing conditions to produce a hydrodewaxed kerosene feedstock; and fractionating the hydrodewaxed kerosene feedstock to produce a jet fuel.

BRIEF DESCRIPTION OF THE FIGURE

FIG. 1 schematically shows a reaction system for performing a process according to an embodiment of the invention.

DETAILED DESCRIPTION OF THE INVENTION

Feedstock

In an embodiment, the feedstock for the present process is a kerosene. Kerosene, such as straight run kerosene, may be obtained from fractionators used to fractionate crudes or distillate fractions thereof. In another embodiment, suitable feedstocks can include conventional crude-oil derived kerosene as well as paraffinic hydrocarbons from other refinery sources such as hydrocracker kerosene. Still other process feeds may include paraffinic hydrocarbons, neat or as co-feed, from synthetic crude sources such as Fischer Tropsch oils and/or hydrocarbons derived from biocomponent sources such as triglyceride vegetable and animal fats, including related compounds such as fatty acid methyl esters (FAME), and oil producing algae. For feeds containing oxygenates, it is preferable to pretreat the feed via hydrogenation to remove oxygen and convert unsaturated side chains to paraffinic hydrocarbons. Conversion of paraffinic hydrocarbons to jet fuel via hydroisomerization is one special feature of the current process and catalyst system disclosed.

Suitable feedstocks have a boiling range from 149 to 343° C. (300 to 650° F.), preferably 163 to 316° C. (325 to 600° F.) as measured by ASTM D86 or ASTM D2887. When compared to conventional kerosene, an increased upper end of the boiling range helps to maintain the yield of jet fuel while an increased lower end helps to increase the flash point. Cloud and freeze point increase when the upper end is increased.

Freezing point (wax crystallization) can be a constraining specification in jet fuel production. The primary controls are to cut back end yield (to reject heavy wax molecules) and maximize front end yield (to add solvent to solubilize the heavy molecules in the back end). Wax isomerization significantly reduces the impact of the heavy wax molecules on freezing point permitting more of them to be included resulting in increased jet fuel yield. Other feeds such as diesel fuel or fuel oil are too heavy to meet jet fuel (evaporation) performance requirements.

Another benefit of the present process is that it could extend the yield of dual purpose kerosene, i.e., kerosene that may be used as No. 1 diesel for winter blending or jet fuel depending on the market need.

Hydrotreating

Kerosene feedstocks typically contain sulfur and/or nitrogen contaminants in an amount unacceptable for jet fuels. Accordingly, the kerosene feedstock is contacted with a hydrotreating catalyst under conditions effective to remove at least a portion of the sulfur and/or nitrogen contaminants to produce a hydrotreated kerosene. Hydrotreating catalysts suitable for use herein are those containing at least one Group 6 (based on the IUPAC Periodic Table having Groups 1-18) metal and at least one Groups 8-10 metal, including mixtures thereof. Preferred metals include Ni, W, Mo, Co and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst.

Suitable metal oxide supports include oxides such as silica, alumina, silica-alumina or titania, preferably alumina. Preferred aluminas are porous aluminas such as gamma or eta. These catalysts typically include metals within the range described above in relation to bulk catalyst and at least one extrusion agent. The amount of metals for supported hydrotreating catalysts, either individually or in mixtures, ranges from 0.5 to 35 wt. %, based on catalyst. In the case of preferred mixtures of Group 6 and Groups 8-10 metals, the Group 8-10 metals are present in amounts of from 0.5 to 5 wt. %, based on catalyst and the Group 6 metals are present in amounts of from 5 to 30 wt. %. The amounts of metals may be measured by atomic absorption spectroscopy, inductively coupled plasma-atomic emission spectrometry or other methods specified by ASTM for individual metals. Non-limiting examples of suitable commercially available hydrotreating catalysts include NEBULA™, KF-840, KF-848, KF-757, and DN-200. Preferred catalysts are low acidity, high metals content catalysts including KF-848 and NEBULA™.

The kerosene feedstock contacted with hydrotreating catalyst reduces the nitrogen and/or sulfur content of the feedstock. The nitrogen content of the feedstock is typically reduced to 10 wppm or less, preferably 5 wppm or less. The sulfur content of the feedstock is typically reduced to 500 wppm or less, preferably 300 wppm or less.

Hydrotreating conditions involve temperatures in the range 240° C. to 400° C., preferably 300° C. to 380° C. at pressures in the range of 1480 to 20786 kPa (200 to 3000 psig), preferably 2859 to 13891 kPa (400 to 2000 psig), a space velocity of from 0.1 to 10 LHSV, preferably 0.1 to 5 LHSV, and a hydrogen treat gas rate of from 18 to 890 m$^3$/m$^3$ (100 to 5000 scf/B), preferably 44 to 178 m$^3$/m$^3$ (250 to 1000 scf/B).

Hydrotreating typically reduces nitrogen and sulfur contaminants in the kerosene feedstock by converting these contaminants to ammonia and hydrogen sulfide, respectively. These gaseous contaminants may preferably be separated from the hydrotreated kerosene using conventional techniques such as strippers, knock-out drums and the like. In the alternative, the entire gaseous and liquid effluent from the hydrotreater may be sent to the next stage. Direct cascade is preferred for drop-in to existing reactors that do not have interstage separation.

The hydrotreating reaction stage can be comprised of one or more fixed bed reactors or reaction zones each of which can comprise one or more catalyst beds of the same hydrotreating catalyst. Although other types of catalyst beds can be used, fixed beds are preferred. Such other types of catalyst beds include fluidized beds, ebullating beds, slurry beds, and moving beds. Interstage cooling or heating between reactors or reaction zones, or between catalyst beds in the same reactor or reaction zone, can be employed since the desulfurization reaction is generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

In an alternative embodiment, a kerosene feed may be selected that has a low level of contaminants. In such an embodiment, the hydrotreating step may be omitted. Examples of kerosene feeds that could have sufficiently low levels of contaminants include hydrocracker kerosene and kerosene derived from a Fischer-Tropsch oil.

Hydrodewaxing

The effluent, preferably all the effluent, most preferably all the stripped effluent, from the hydrotreater is then contacted with a hydroisomerization dewaxing catalyst in a second reaction stage under hydroisomerization conditions to produced a hydrodewaxed kerosene feedstock. The dewaxing catalyst will typically contain a metal hydrogenation component and a 10 member ring 1-D molecular sieve supported on a refractory metal oxide. The metal hydrogenation component is preferably a Group 8-10 metal, more preferably a noble metal, most preferably Pd, Pt or a mixture thereof. The amount of metal component is in the range from 0.1 to 5 wt. %, based on catalyst, preferably 0.1 to 2 wt. %. The refractory metal oxide may be alumina, silica, silica-alumina, titania, zirconia and the like, preferably alumina, most preferably gamma alumina.

The amount of molecular sieve in the dewaxing catalyst is from 10 to 100 wt. %, preferably 40 to 80 wt. %, based on catalyst. The balance of the dewaxing catalyst is refractory support and metal hydrogenation component. Such catalysts can be formed by methods such spray drying, extrusion and the like. The dewaxing catalyst may be used in the sulfided or unsulfided form, and is preferably in the sulfided form.

The 10 member ring 1-D molecular sieve can be ZSM-23, ZSM-35, ZSM-48, or another suitable molecular sieve. Preferably, the molecular sieve is ZSM-48 with a ratio of silica to alumina in the ZSM-48 of less than about 110:1.

The at least one hydrogenation metal is incorporated, i.e. deposited, onto the catalyst before or after, preferably after the binder and/or support, such as refractory metal oxide support, has been incorporated with the molecular sieve. The at least one hydrogenation metal can be deposited by any means known to be effective at doing so. Non-limiting examples of suitable incorporation means include incipient wetness, ion exchange, mechanical mixing of metal oxide precursor(s) with molecular sieve and binder, or a combination thereof, with the incipient wetness technique being the preferred method.

In one embodiment of the present invention, a kerosene feedstream is contacted with the above-described hydrodewaxing catalyst in a reaction stage under effective hydrodewaxing conditions. The reaction stage containing the hydrodewaxing catalyst used in the present invention can be comprised of one or more fixed bed reactors or reaction zones each of which can comprise one or more catalyst beds of the same or different catalyst. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of any heat generated can also be recovered. Where this heat recovery option is not available, conventional cooling may be performed through cooling utilities such as cooling water or air, or through use of a hydrogen quench stream. In this manner, optimum reaction temperatures can be more easily maintained. It should be noted that the reaction stage containing the dewaxing catalyst is sometimes referred to as the second reaction stage.

Effective hydrodewaxing conditions involve temperatures in the range 240° C. to 400° C., preferably 300° C. to 380° C. at pressures in the range of 1480 to 20786 kPa (200 to 3000 psig), preferably 2859 to 13891 kPa (400 to 2000 psig), a space velocity of from 0.1 to 10 LHSV, preferably 0.1 to 5 LHSV, and a hydrogen treat gas rate of from 18 to 890 m$^3$/m$^3$ (100 to 5000 scf/B), preferably 44 to 178 m$^3$/m$^3$ (250 to 1000 scf/B).

The use of a catalyst containing a 10 member ring 1-D molecular sieve improves the low temperature properties while minimizing the amount of kerosene converted to lower boiling fractions such as naphtha. Thus single iso-paraffins may either hydrocrack or more preferably isomerize to more branched molecules. These more highly branched iso-paraffins are protected from further reaction such as cracking. In particular, ZSM-48 is an excellent catalyst for hydroisomerizing straight chain and singly branched iso-paraffins without significant cracking taking place. This improves the yield of jet fuel. In addition, the overall process improves the smoke point to acceptable levels by saturating aromatic compounds and also provides an economical method for lowering sulfur and nitrogen-containing contaminants to acceptable levels.

Process

In one embodiment, the hydrotreating catalyst and dewaxing catalyst occupy different fixed beds in the same reactor. It is preferred that the hydrotreating catalyst contact kerosene feedstock first, i.e., is placed upstream of the dewaxing catalyst. In an embodiment where ZSM-48 is selected as the molecular sieve, it is preferred that if the amount of $H_2S/NH_3$ formed by hydrotreating is not excessive, the entire effluent from the hydrotreating stage may be sent to the dewaxing stage as ZSM-48 is more tolerant of these contaminants than are other isomerizing dewaxing catalysts. However, if the amount of $H_2S/NH_3$ formed by hydrotreating is excessive, then the effluent from the hydrotreating stage may be stripped to remove these contaminants. The flow is feedstock through the reactor may be co-current or counter-current, preferably counter-current. Hydrogen may be added to the feedstock stream prior to entering the reactor.

In another embodiment, the hydrotreating catalyst is in a separate first reactor. The effluent from the first reactor is conducted, with or without stripping to remove gases such as light hydrocarbons and $H_2S/NH_3$, to a second reactor containing dewaxing catalyst. Again, the decision for by-passing an interstage stripper is a function of the nature of the molecular sieve and the degree of contamination of the effluent from the first reactor. Alternatively, another type of separator may be used between the hydrotreatment and dewaxing stages.

In either embodiment, the effluent from the dewaxing stage may be conducted to a separator, preferably a high pressure separator, and the liquid effluent from the separator is sent to a fractionator to produce the desired jet fuel having improved yield and properties.

A reaction system suitable for carrying out the above processes is shown schematically in FIG. 1. In FIG. 1, a kerosene feedstock 108 is introduced into a first hydrotreatment reactor 110. A hydrogen treat gas stream 115 is also introduced into hydrotreatment reactor 110. The kerosene feedstock is exposed to hydrotreating conditions in first hydrotreatment reactor 110 in the presence of one or more catalyst beds that contain hydrotreating catalyst. Optionally, the treated feedstock flows into a separator 122, where gas phase products are separated from liquid phase products. Optionally, a portion of the gas phase products separated by separator 122 may be cascaded back to the first reactor as a recycled hydrogen treat gas stream (not shown). After passing through first hydrotreatment reactor 110 and optionally separator 122, the treated feedstock enters dewaxing reactor 140, along with a second hydrogen treat gas stream 125. The treated feedstock can then pass through a separator 142 for separating out a fuel suitable for use as a jet fuel. In an alternative embodiment, the hydrotreatment and dewaxing stages may be contained in a single reactor.

The above description is directed to preferred embodiments of the present invention. Those skilled in the art will recognize that other embodiments that are equally effective could be devised for carrying out the spirit of this invention.

The following example will illustrate the improved effectiveness of the present invention, but is not meant to limit the present invention in any fashion.

EXAMPLE

The hydrotreating and dewaxing of a kerosene feedstock was accomplished in a two-reactor system with no interstage stripping between reactors 1 and 2. Reactor 1 was loaded with a commercially available (Criterion) CoMo hydrotreating catalyst. Reactor 2 was loaded with a Pt/ZSM-48 dewaxing catalyst.

The kerosene feedstock was prepared from predominantly Arabian light crude to represent cutting deeper into the crude to make heavier kerosene. While a normal commercial jet fuel cut has a normal boiling range from 300 to 550° F. (149 to 288° C.), the kerosene cut had a boiling range of 325 to 575° F. (163 to 302° C.). The higher initial boiling point was used to increase the flash point and the higher end point was used to maintain the same overall yield on crude. The feedstock (Feed #2) and properties are summarized in Table 1. The experimental results are summarized in Table 2.

TABLE 1

| | | |
|---|---|---|
| API Gravity | | 43.8 |
| Nitrogen, ppm | | 4.9 |
| Sulfur, ppm | | 4204 |
| Hydrogen, wt % | | 13.81 |
| Flash Point, ° C. | [D93] | 63 |
| Freezing Point, ° C. | [D5972] | −31.2 |
| Smoke Point, mm | | 22.2 |
| Aromatics, wt % | [D5186] | 25.7 |
| Flash Point, ° F. | [D56] | 154 |
| Viscosity, KV@ −20 F. | | 8.855 |
| Viscosity, KV@ 0 F. | | 5.772 |
| Naphthalene, wt % | [D1840] | 3.4 |
| Aromatics, vol % | [D1319-1] | 22.12 |
| Distillation | [D2887] | |
| IBP, ° F. | | 300 |
| 5 | | 333 |
| 10 | | 349 |
| 20 | | 375 |
| 30 | | 397 |
| 40 | | 420 |
| 50 | | 445 |
| 60 | | 468 |
| 70 | | 496 |
| 80 | | 524 |
| 90 | | 550 |
| 95 | | 567 |
| EP | | 597 |

TABLE 2

Jet Fuel Data Summary

| | | FEEDSTOCK Feed#2 | | |
|---|---|---|---|---|
| CONDITIONS | | MB330 | MB329 | MB334 |
| Pressure, psig | | 400 | 400 | 400 |
| Rxr. Temp (HDT) | | 600 | 650 | 650 |
| Rxr. Temp (Dewaxing) | | 300 | 650 | 675 |
| LHSV (HDT) | | 5 | 5 | 5 |
| LHSV (Dewaxing) | | 2.5 | 2.5 | 2.5 |
| H2 SCF/Bbl | | 2000 | 2000 | 2000 |
| YIELDS, wt % | | | | |
| H2 Consumed, SCFB | | 75 | 95 | 150 |
| C1-C2 | | 0 | 0.1 | 0.1 |
| C3 | | 0 | 0.5 | 0.8 |
| C4 | | 0 | 1.1 | 1.8 |
| C5-330 | | 2.9 | 7.9 | 13.9 |
| 330+ | | 96.8 | 90.2 | 83.2 |
| | Jet-A | Pilot Plant | Nominal 350 F. + Bottoms | |
| Properties | Spec | Feed #2 | HDT | HDT/Dewaxing |
| API Gravity | 37-51 | 43.8 | 44.2 | 44.0 | 43.4 |
| Freeze Point, Deg C. | <−40 C. | −31.2 | −30 | −40.6 | −52 |
| Flash Point, Deg F. | >100 F. | 145 | 160 | 154 | 135 |

TABLE 2-continued

Jet Fuel Data Summary

|  |  |  |  |  |  |
|---|---|---|---|---|---|
| Naphthalenes, wt % | <3% | 3.4 | — | 1.2 | 1.8 |
| Aromatics, vol % | <25 | 22.1 | 20.9 | 20.1 | 21.8 |
| Smoke Point, mm | >18 mm | 22.2 | 23.0 | 22.5 | 21.2 |
| Visscosity, KV@−18 C. | 8@−20 C. | 5.8 | 7.0 | 6.8 | 6.8 |
| Hydrogen, wt % |  | 13.81 | 13.95 | 13.87 | 13.81 |
| Sulfur, ppm |  | 4200 | 70 | 15 | 12 |
| Nitrogen, ppm |  | 5 | <0.5 | <0.5 | <0.5 |

In the first experiment designated MB 330, the Pt/ZSM-48 catalyst is "turned off" by operating at a low temperature. The results show that hydrotreating alone is ineffective for reducing Freezing Point to the required specification. In the second experiment (MB 329), the Pt/ZSM 48 catalyst is brought on-line at 650° F. (343° C.), resulting in a 90.2 wt. % yield of high flash point, ultra low sulfur jet fuel. The last experiment (MB 334) demonstrates that yet higher Pt/ZSM 48 catalyst severity (675° F., 357° C.) can be employed to produce a very low freeze point jet fuel with a high flash point in excellent yield (83.0 wt. %). Smoke point and aromatics are improved in all cases.

What is claimed is:

1. A process for producing a jet fuel from a kerosene feedstock which comprises:
   hydrotreating the kerosene feedstock with a boiling range from 163 to 302° C. (325 to 575° F.) in the presence of a hydrotreating catalyst under hydrotreating conditions to produce a hydrotreated kerosene feedstock;
   dewaxing substantially all of the hydrotreated kerosene feedstock in the presence of a catalyst including a 10 member ring 1-D molecular sieve under dewaxing conditions to produce a hydrodewaxed kerosene feedstock; and
   fractionating the hydrodewaxed kerosene feedstock to produce a jet fuel;
   wherein:
   the dewaxing conditions include temperatures of from 300° C. to 380° C. (572 to 716° F.), pressures of from 791 to 20786 kPa (100 to 3000 psig), liquid hourly space velocities of from 0.1 to 10 hr$^{-1}$, and hydrogen treat gas rates from 45 to 1780 m$^3$/m$^3$ (250 to 10000 scf/B); and
   the jet fuel has an API Gravity from 37-51, a freeze point less than −52° C. (−61.6° F.), a flash point greater than 100° F. (37.8° C.), a smoke point greater than 18 mm; and
   the yield of hydrodewaxed kerosene feedstock is at least 83.2 wt % based on the kerosene feedstock.

2. The process of claim 1 wherein the hydrotreating conditions include temperatures in the range 280° C. to 400° C., pressures in the range of 1480 to 20786 kPa (200 to 3000 psig), a space velocity of from 0.1 to 10 LHSV, and a hydrogen treat gas rate of from 89 to 1780 m$^3$/m$^3$ (500 to 10000 scf/B).

3. The process of claim 1 wherein the hydrotreating catalyst contains least one Group 6 metal, at least one Groups 8-10 metal or mixtures thereof.

4. The process of claim 3 wherein, eating catalyst may be supported or unsupported.

5. The process of claim 1, wherein the 10 member ring 1-D molecular sieve is ZSM-48.

6. The process of claim 1 wherein the dewaxing catalyst contains at least one metal hydrogenation component.

7. The process of claim 6 wherein the metal hydrogenation component is Pt, Pd or a mixture thereof.

8. The process of claim 1 wherein the hydrotreating catalyst and the dewaxing catalyst occupy separate beds within a reactor.

9. The process of claim 1 wherein the hydrotreating catalyst and the dewaxing catalyst are contained in separate reactors.

10. The process of claim 1, wherein the kerosene feedstock is derived at least in part from a biocomponent source.

11. The process of claim 10, wherein the kerosene feedstock is derived at least in part from triglyceride vegetable oils.

12. The process of claim 10, wherein the kerosene feedstock is derived at least in part from fatty acid methyl esters.

13. The process of claim 10, wherein the kerosene feedstock is derived at least in part from animal fats.

14. The process of claim 10, wherein the kerosene feedstock is derived at least in part from oil-producing algaes.

15. The process of claim 1, further comprising performing a separation on the hydrotreated kerosene feedstock prior to dewaxing.

16. The process of claim 15, wherein the separation comprises stripping the hydrotreated kerosene feedstock.

17. A process for producing a jet fuel from a kerosene feedstock which comprises:
   dewaxing a kerosene feedstock with a boiling range from 163 to 302° C. (325 to 575° F.) in the presence of a catalyst including a 10 member ring 1-D molecular sieve under dewaxing conditions to produce a hydrodewaxed kerosene feedstock; and
   fractionating the hydrodewaxed kerosene feedstock to produce a jet fuel;
   wherein:
   the dewaxing conditions include temperatures of from 300° C. to 380° C. (572 to 716° F.), pressures of from 791 to 20786 kPa (100 to 3000 psig), liquid hourly space velocities of from 0.1 to 10 hr$^{-1}$, and hydrogen treat gas rates from 45 to 1780 m$^3$/m$^3$ (250 to 10000 scf/B); and
   the jet fuel has an API Gravity from 37-51, a freeze point less than −52° C. (−61.6° F.), a flash point greater than 100° F. (37.8° C.), a smoke point greater than 18 mm; and
   the yield of hydrodewaxed kerosene feedstock is at least 83.2 wt % based on the kerosene feedstock.

18. The process of claim 17, wherein the 10 member ring 1-D molecular sieve is ZSM-48.

* * * * *